(12) United States Patent
Dickinson

(10) Patent No.: US 10,703,293 B2
(45) Date of Patent: Jul. 7, 2020

(54) VEHICLE ROOF BOX WITH CENTRAL, EXTERNAL ATTACHMENT SYSTEM

(71) Applicant: HORIZON GLOBAL AMERICAS INC., Plymouth, MI (US)

(72) Inventor: Martin Ian Dickinson, Northamptonshire (GB)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 16/314,062

(22) PCT Filed: Jun. 30, 2017

(86) PCT No.: PCT/US2017/040241
§ 371 (c)(1),
(2) Date: Dec. 28, 2018

(87) PCT Pub. No.: WO2018/005944
PCT Pub. Date: Jan. 4, 2018

(65) Prior Publication Data
US 2019/0225161 A1    Jul. 25, 2019

Related U.S. Application Data

(60) Provisional application No. 62/356,879, filed on Jun. 30, 2016.

(51) Int. Cl.
*B60R 9/055* (2006.01)
*B60R 9/058* (2006.01)

(52) U.S. Cl.
CPC .............. *B60R 9/055* (2013.01); *B60R 9/058* (2013.01)

(58) Field of Classification Search
CPC ................................ B60R 9/055; B60R 9/058
USPC ........................................................ 224/309
See application file for complete search history.

(56) References Cited

U.S. PATENT DOCUMENTS

| | | | | |
|---|---|---|---|---|
| 5,833,103 A | * | 11/1998 | Rak ........................ | B60R 9/045 224/321 |
| 5,924,614 A | * | 7/1999 | Kuntze .................... | B60R 9/045 224/321 |
| 6,112,964 A | * | 9/2000 | Cucheran ................ | B60R 9/045 224/309 |
| 6,131,782 A | * | 10/2000 | De Silva ................. | B60R 9/045 224/315 |

(Continued)

FOREIGN PATENT DOCUMENTS

WO    20110145952    11/2011

OTHER PUBLICATIONS

Patent Cooperation Treaty (PCT), International Search Report and Written Opinion for Application PCT/US2017/040241 filed Jun. 30, 2017, dated Oct. 13, 2017, International Searching Authority, EP.

*Primary Examiner* — Peter N Helvey
(74) *Attorney, Agent, or Firm* — McDonald Hopkins LLC

(57) ABSTRACT

A roof box for carrying cargo affixed to the roof rack rails of a vehicle is described. The attachment mechanism operates without the need to access the interior of the roof box itself and without disrupting the continuity of the floor board in the roof box. The user may deploy the engagement system from a single control point, and the individual attachment mechanisms include safety mechanisms to guard against an unexpected failure of other system components.

28 Claims, 14 Drawing Sheets

(56) References Cited

U.S. PATENT DOCUMENTS

| | | | | |
|---|---|---|---|---|
| 6,779,696 B2* | 8/2004 | Aftanas | ................... | B60R 9/045 224/315 |
| 7,044,345 B2* | 5/2006 | Aftanas | ................... | B60R 9/045 224/321 |
| 7,198,184 B2* | 4/2007 | Aftanas | ................... | B60R 9/045 224/309 |
| 7,802,707 B2 | 9/2010 | Aftanas | | |
| 8,056,782 B2* | 11/2011 | Lim | ................... | B60R 9/045 224/321 |
| 8,251,267 B2* | 8/2012 | Aftanas | ................... | B60R 9/045 224/315 |
| 8,302,828 B2* | 11/2012 | Kim | ................... | B60R 9/045 224/309 |
| 8,757,457 B2* | 6/2014 | Settelmayer | ............ | B60R 9/058 224/309 |
| 9,290,131 B2* | 3/2016 | Sautter | ................... | B60R 9/055 |
| 2013/0292436 A1 | 11/2013 | Hubbard et al. | | |

\* cited by examiner

VEHICLE ROOF BOX WITH CENTRAL, EXTERNAL ATTACHMENT SYSTEM

CROSS-REFERENCE TO RELATED APPLICATIONS AND FIELD OF INVENTION

This application is a 35 U.S.C. 371 national stage filing of and claims priority to International Application No. PCT/US2017/040241 filed on Jun. 30, 2017, which claims priority to and all the benefits of U.S. Patent Application Ser. No. 62/356,879, filed on Jun. 30, 2016 and having the same title as noted above which are both incorporated herein by reference in their entirety.

The present invention is generally related to a cargo-carrying box attached to roof rack on top of a vehicle; and more particularly to a system configured to have a central, external apparatus associated with the box for attachment to the vehicle roof rack without the need to access the interior of the box.

BACKGROUND

Roof rack assemblies used in combination with vehicle roof-top cargo boxes are a common means of storing and transporting luggage and other items on during automotive travel. Not only do these apparatus expand the overall volume of cargo that may be transported, but certain designs allow accommodate items which would not otherwise fit inside the vehicle. These units usually rely on attachment to a pair of rails affixed to the top of the vehicle, and they may be used on many different types of vehicles, such as mini-vans, sport utility vehicle, cars, and the like.

Because these units create unwanted drag, wind noise, and sometimes entail other, minor inconveniences, drivers may remove the roof-top box when it is not in use. Many of the previously known systems rely on mechanisms to attach the roof box to the transverse bars of a roof rack. These attachment mechanism are usually located within the interior of the roof box itself. Consequently, the user must be able to access—and see into—the roof box, which can be quite challenging with respect to mini-vans, sports utility vehicles, and other automobiles possessing a high profile or otherwise having a roof line that is substantially above the ground.

FIGS. 1A-1D illustrate various types of attachment systems associated with roof boxes currently in use. For example, FIGS. 1A and 1B depict, respectively speaking, U-bolt attachment member 20 and roof top box 10 with an aperture 12 in the floor board 14 through which U-bolt 10 can be inserted to attach the box 20 to a roof rack rail (not shown). The terminal ends 22, 24 of the attachment member 20 engages a roof bar and includes screw-action handwheels 23, 25 and baseplate 26 to tighten and secure the roof box 10 to the vehicle. In the alternative embodiments, the attachment member 10 could have a simple J-shape or a C-shape, but in all cases, the user must guide the one of the terminal ends 22 through the aperture 14 and around the underside of roof bar. This arrangement requires clear sight lines, dexterity, and freedom of movement for the user that may not be easily achieved. Also, the handwheels 23, 25 (or other mechanisms employed to secure and tighten the assembly) occupy internal volume of the box 10 that could otherwise be used for storage while also disrupting the continuity of the floor board 14. Another example of this style of attachment member is shown in U.S. Pat. No. 8,757,457, granted on Jun. 24, 2014.

An alternative roof box attachment member 30 is shown in FIG. 1C. Here, rather than relying on a u-shaped bolt to engage the underside of the roof bar, a pincer-type "claw" or movable jaws which engage the bar. In particular, at least one of the arms 32, 34 are moved into an open or closed by way of drive wheel 36, usually through the use of gears (not shown) or other common mechanisms. As above, member 30 must be fitted through an aperture in the roof box, and similar issues arise with respect to taking up internal volume and disrupting the continuity of the floor board in the roof box. Another example of this style of attachment member is shown in European Patent 2536593B1, granted on Aug. 26, 2015.

FIG. 1D generally illustrates a "low profile" attachment system that may incorporate the mechanisms of FIGS. 1A and/or 1C. Here, individually bays 40, 41, 42, and 43 provide recessed volume in which to operate attachment mechanisms in which clamping pressure and/or user force are applied so as to minimize any physical intrusion into the roof box interior and compromising of the continuity of the floor board itself.

Finally, an arrangement with a relatively low interior profile that can be nominally operated without access through the interior of the roof box is disclosed in United States Patent Publication 2013/0264366, published on Oct. 10, 2013. A system relying on an externally accessible actuator to engage the bar is found in U.S. Pat. No. 8,807,407, granted on Aug. 19, 2014.

In the foregoing instances, access to the interior of the roof box and/or individual user attention/intervention to each attachment point are required, while relatively little attention appears to be given to simplifying the user experience and/or providing safety mechanisms in the event of a failure of any of the attachment components. Accordingly, a roof rack assembly with central, external attachment mechanisms to address these, and other, issues would be welcome.

SUMMARY

A system for attaching a cargo-carrying box to a roof rack affixed to the top of a vehicle is contemplated. Specific reference is made to the appended claims, drawings, and description below, all of which disclose elements of the invention. While particular embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

In one embodiment, the system includes any of the following combination of features:

Cargo platform including an uninterrupted cargo floor

Transverse drive shaft having an actuator accessible on a lateral facing of the cargo platform A plurality of engagement claws disposed on an underside of the cargo platform Wherein each of the engagement claws are selectively driven between an open position and a closed, locked position by movement of the actuator Actuator relies upon rotational movement to drive the engagement claws Torque limiter Lockable crank handle Folding crank handle Wherein the actuator includes a pair of a crank handles disposed on opposing lateral facings of the platform such that movement of the actuator can be initiated by one of the crank handles Transverse drive shaft comprises at least one lateral track with at least one engagement claw moving within the lateral track A secondary pulley assembly attached to at least one engagement claw moves laterally within a channel formed in the lateral track Wherein a drive cable moves in a second channel in the lateral track Wherein a drive cable moves within a channel formed in the lateral track Wherein the lateral track includes ratchet teeth along an inner facing Wherein the engagement claw faces and selectively engages the ratchet teeth At least one pulley system is attached to an end of the lateral track Transverse drive shaft comprises a differential gear drive A pair of articulating, pivotable drive arms with at least one engagement claw attached Transverse drive shaft comprises a pulley system having a drive cable The pulley system includes a flywheel urged along the drive shaft by the drive cable An end block pulley assembly engaging the drive cable A secondary pulley blocks driven by a secondary drive cable Plurality of flywheels An idler pulley Driven by rotational force from the actuator Each engagement claw includes a biasing member positioned to selectively urge the engagement claw toward the transverse drive shaft Selectively driven laterally away from the transverse drive shaft by a drive cable, with the biasing member disposed at an opposing lateral end of the engagement claw relative to the drive cable Movable jaw with an opening facing away from the transverse drive shaft Movable jaw is urged into the closed position by a slave cable Slave cable is attached to one of a cam pulley and a movable pulley Retractable safety pawl.

In another aspect, the invention comprises a drive system for attaching a roof-top carried accessory to a vehicle's roof rails including any combination of the following:

A central drive shaft having an actuator

At least one track connected at an angle at or proximate to one end of the central drive shaft At least one engagement claw seated in the track and connected to and moving in response to rotation of the actuator Wherein a pair of engagement claws move in concert away from or toward each other within the track A drive pulley assembly moving along the drive shaft in response to rotation of the actuator A drive cable engaging the drive pulley assembly and a pulley block end located at one end of the track Wherein at least one of the pulley block and the drive pulley assembly include a flywheel Wherein at least one of the pulley block and the drive pulley assembly include an idler pulley Wherein the pulley block includes a secondary drive cable engaging the engagement claw and a second pulley in the pulley block assembly Wherein the engagement claw includes a trigger mechanism selectively closing and opening a jaw in response to contact between a trigger lever and a vehicle roof bar Wherein the trigger mechanism includes a slave cable cooperating with a cam pulley or a movable pulley Wherein the trigger mechanism includes a safety pawl that retracts when the actuator is engaged Wherein the drive system includes a plurality of tracks, each track having substantially identical components arranged in a mirrored fashion Wherein the track and drive shaft are disposed orthogonally to one another Wherein the drive system has an H-shape Wherein the track includes two pulley blocks disposed at opposing ends Wherein the engagement claw includes at least one biasing member Wherein the track comprises a first channel at least partially encasing the drive cable and the second channel guides movement of the engagement claw In a further aspect, the invention contemplates an engagement claw assembly, moving in response to a driver, that automatically opens and closes upon contact with a roof bar including any combination of the following:

A housing with a jaw pivotally attached thereto

A trigger mechanism contained within the housing

A drive plunger connecting to a drive cable

A slave cable engaging the trigger mechanism

Wherein the trigger mechanism selectively urges the engagement claw assembly in a lateral direction or urges the jaw into a closed position when the trigger mechanism comes into contact with a roof bar Wherein the trigger mechanism includes a lever that releases a movable pulley in response to contact with the roof bar, wherein the movable pulley engages the slave cable Wherein the trigger mechanism includes a cam pulley engaging a cam pawl, wherein the cam pawl moves in response to contact with the roof bar A ratchet lock assembly selectively extending out of the housing A retractable safety pawl cooperating with the ratchet lock assembly to prevent unwanted movement of the jaw.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

FIG. 2A is a three dimensional perspective illustrating the underside of the roof box according to certain embodiments of the invention, while

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As illustrated herein, the roof box is attached to the transverse bar or rail of a roof rack system. Most roof racks include two bars aligned in a relatively parallel to one another and transverse to the vehicle's forward orientation. Of course, additional bars may be provided, and these bars need not be perfectly aligned or parallel. The cross-sectional shape of the bars may be oval or tear-drop in nature so as to improve the aerodynamic characteristics of the roof rack system, and the attachment mechanisms for roof top boxes will accommodate such varying shapes.

Figure 1A:
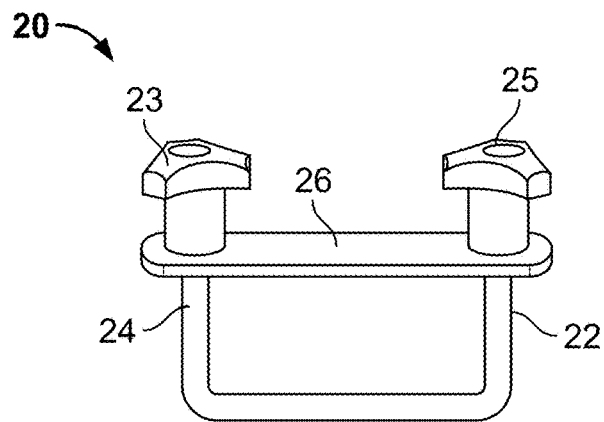
FIGS. 1A, 1B, 1C and 1D illustrate various embodiments of known roof box and attachment systems.
Figure 1B:
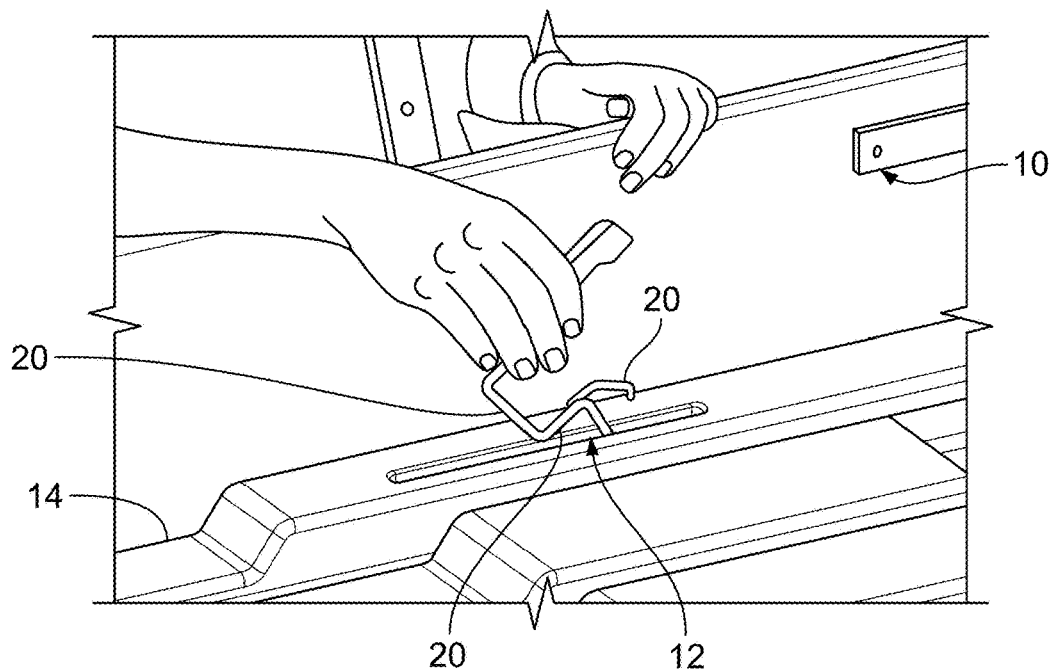
Figure 1C:
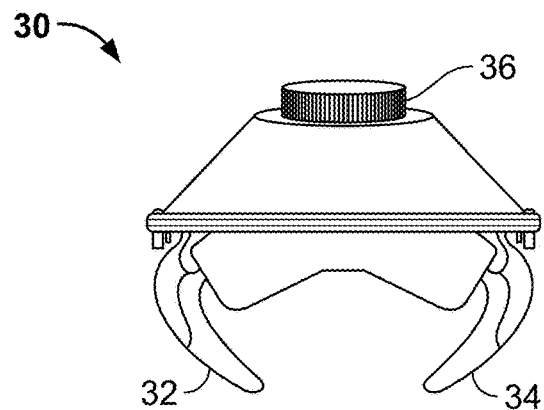
Figure 1D:
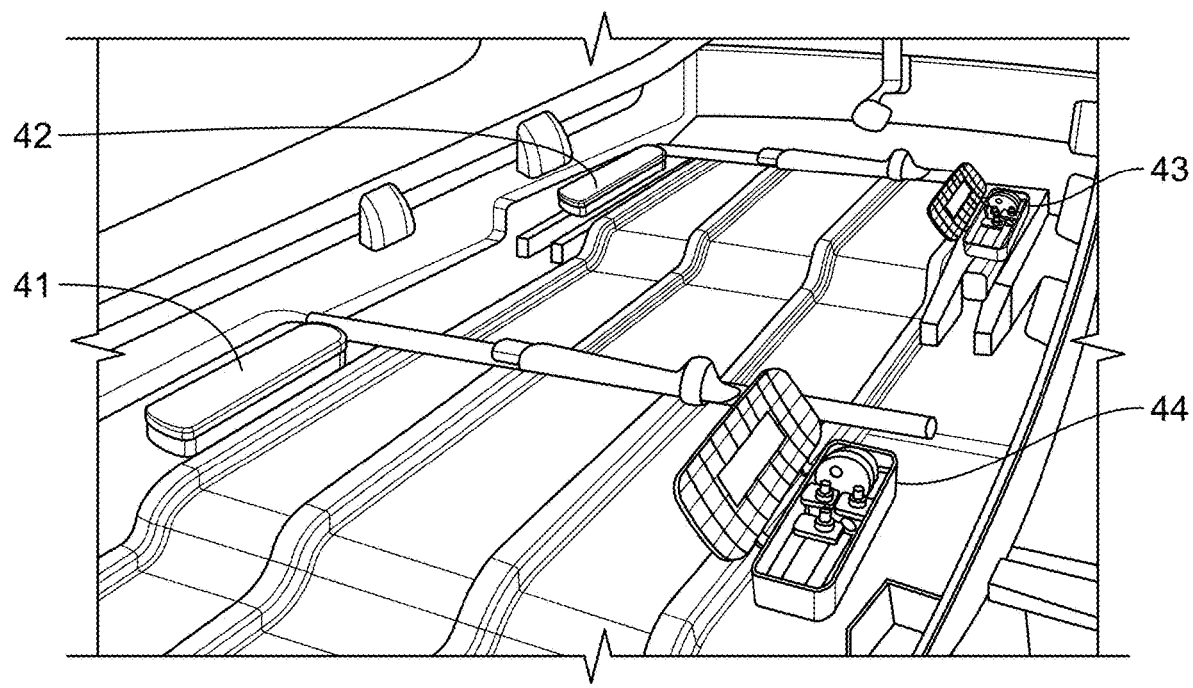
Figure 2A:
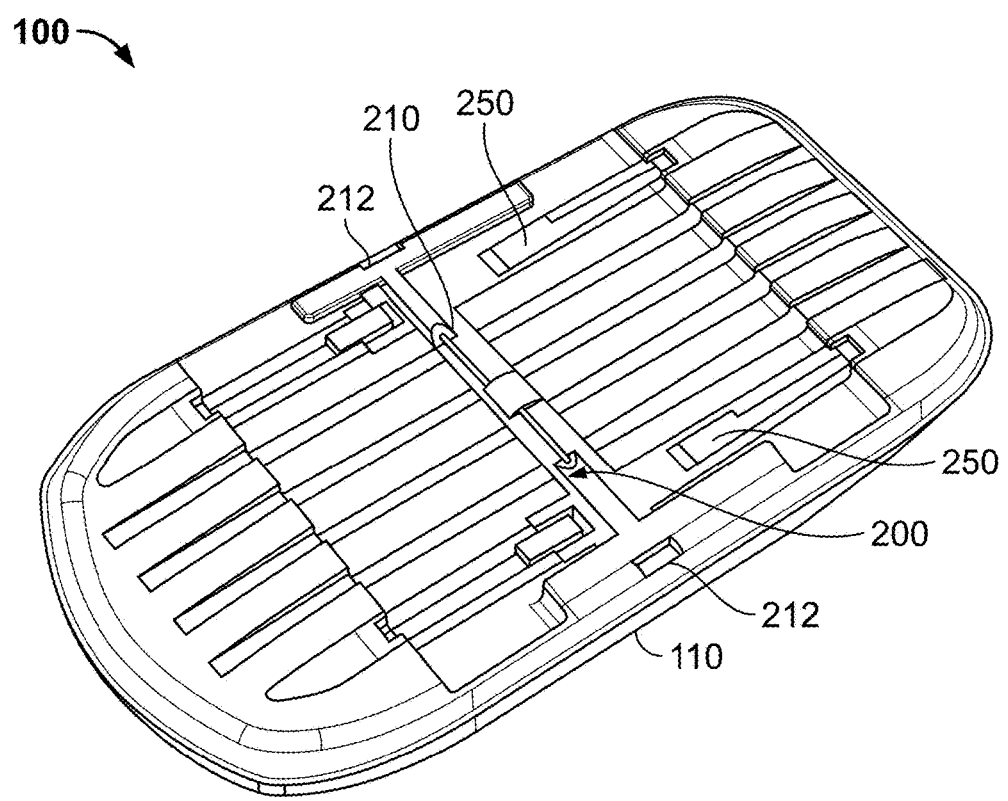
Figure 2B:
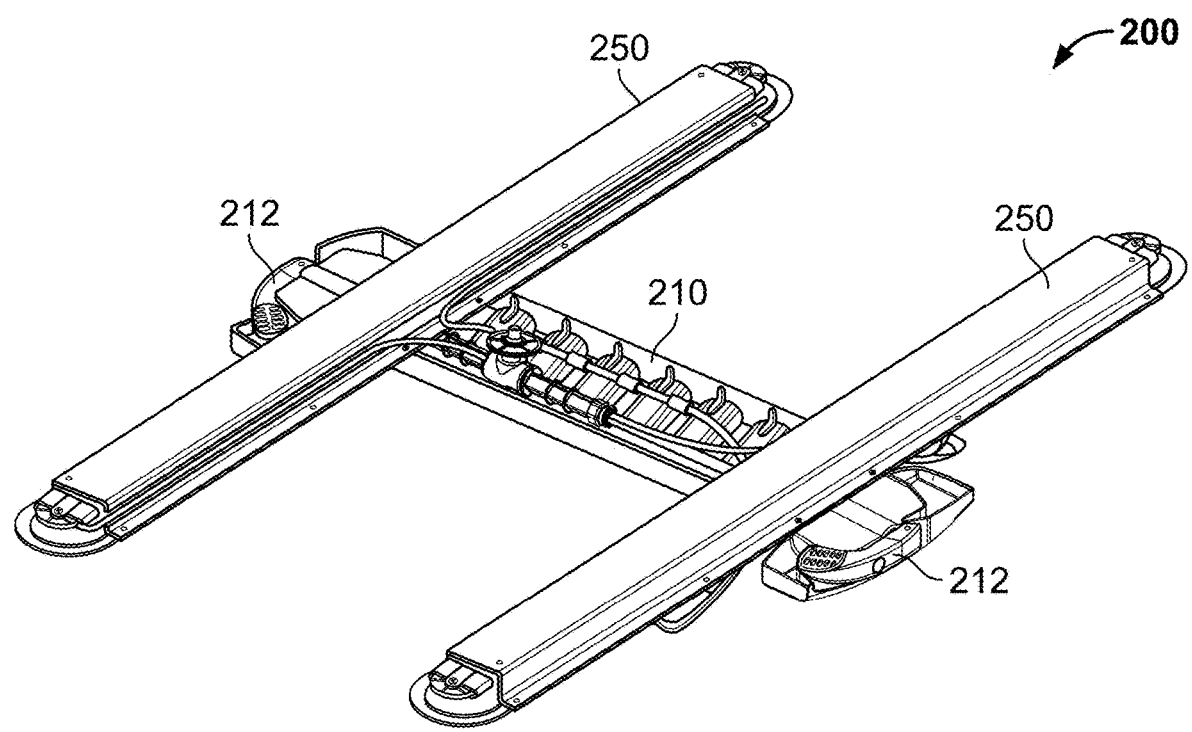
FIG. 2B is a three dimensional perspective illustrating the attachment mechanism integrated along the underside of the roof box in certain embodiments of the invention.

As seen in FIGS. 2A and 2B, the inventive system 100 comprises roof box 110 which integrates an attachment system 200 along its underside (i.e., the portion of box 110 facing the vehicle and its roof rack system). The roof box may be of any variety, but typically consists of a vacuum formed base and lid, with the outer shell made of a strong, lightweight, weather-resistant, and/or ultraviolet light-resistant plastic. Owing to the compact nature of the attachment system 200, it is possible to design the base to incorporate a flat, uninterrupted loading or cargo floor within the interior of the box 110. The system 200 may be attached to a custom, recess molded on the underside of the box 110. As used herein, "uninterrupted" means that no protrusions, access wells, apertures, or other discontinuities are formed in or arise from the base or floor which forms the interior of the box (e.g., compare against FIG. 1D).

Attachment system 200 includes a central housing 210 spanning two roof rack engagement assemblies 250. In a preferred embodiment, the housing 210 and assemblies 250 form an H-shape. The central housing 210 contains a transverse drive system operated by folding, crank handles 212 and connected to engagement assemblies 250 which include pulley and claw systems for attaching to the rails of the roof rack system. The components of the transverse drive system and engagement assemblies are described in greater detail below. Generally speaking, the attachment system 200 allows for external clamping of the roof box 110 to the vehicle roof bars. While an H-shape is shown, it may be possible to reposition the salient component, thereby deviating from this H-shape, but without departing from certain aspects of the invention described herein.

Figure 3A:
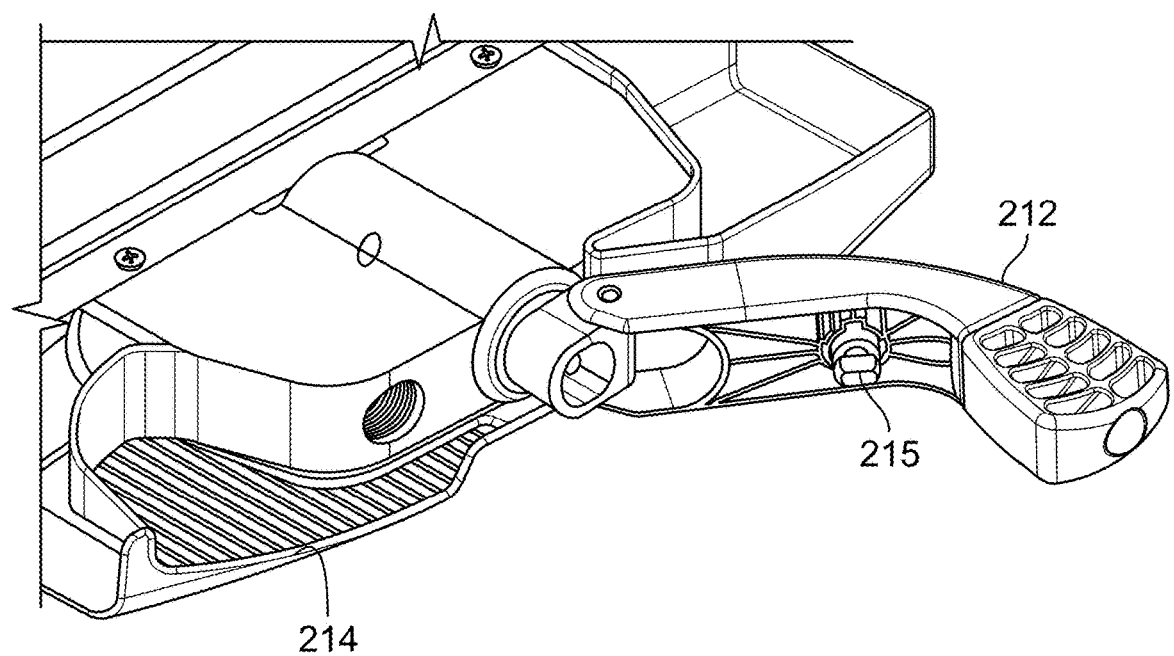
FIG. 3A is a three dimensional perspective of the folding crank handle of the transverse drive assembly in certain embodiments of the invention.
Figure 3B:
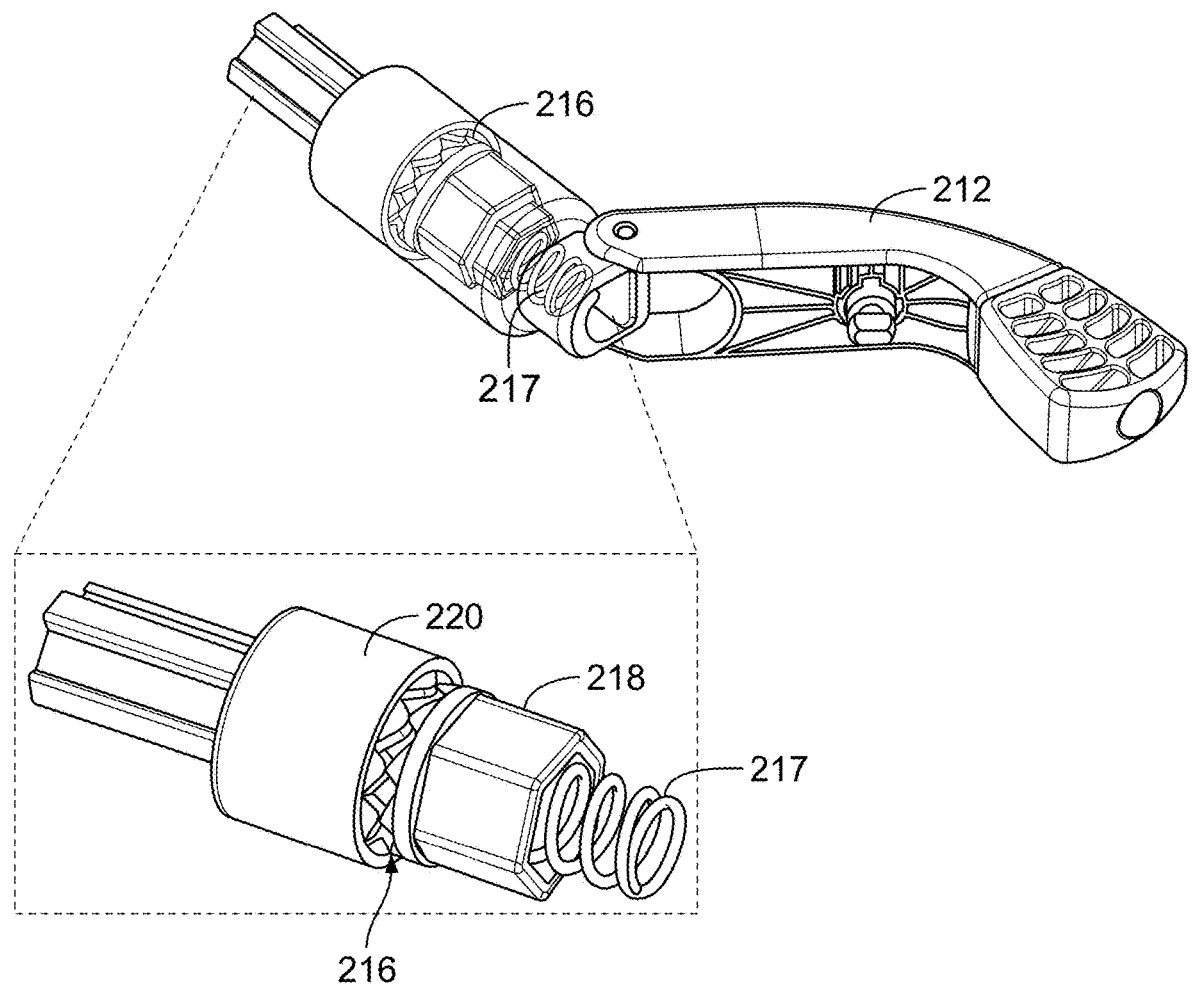
FIG. 3B is a three dimensional illustration of the crank handle, including an expanded, inset view of the wedge clutch torque limiter that may be incorporated with the crank handle.

As seen in FIG. 3A, the folding crank handle 212 is received within a pocket 214 formed on the exterior facing near the base (i.e., proximate to the underside) of the roof box (not shown in this view). An optional locking mechanism 215 may be integrated along the handle or possibly at its central axis to guard against unwanted use. FIG. 3B illustrates a wedge-clutch-type torque limiter 216 that may be included to prevent excessive force from being applied when deploying the attachment mechanism. The limiter 216 comprises a torque limiter biasing member 217 cooperating with ratchet-style teeth formed on terminal ends of both the main drive shaft 220 and the crank handle engagement member 218. The expanded view in the inset of FIG. 3B shows the ratchet teeth disengaged, whereas FIG. 3A illustrates them in an engaged position. If excessive force is applied to the handle, the teeth disengage and prevent rotational movement of the shaft 220.

The folding, pocketed arrangement for the crank handle 212 improves the aerodynamics and aesthetics of the system 100. While two crank handles 212 are depicted at opposite ends of the housing 210 to allow for operation of the transverse drive system from either side of the vehicle, it may be possible to provide only one such handle. Also, when the system 100 is mounted to a vehicle, the crank handle is most likely at or near eye-level of an average adult, thereby allowing for deployment and use of the handle from a ground-level, standing position without the need for additional tools. While handles are shown, knobs, levers, and other devices capable of translating motion into rotational force can be used. Whatever means for operating the system, the result is a single point of control to adjust the clamps into a plurality of discrete engagement/disengagement positions on the vehicle roof rails.

Figure 4:
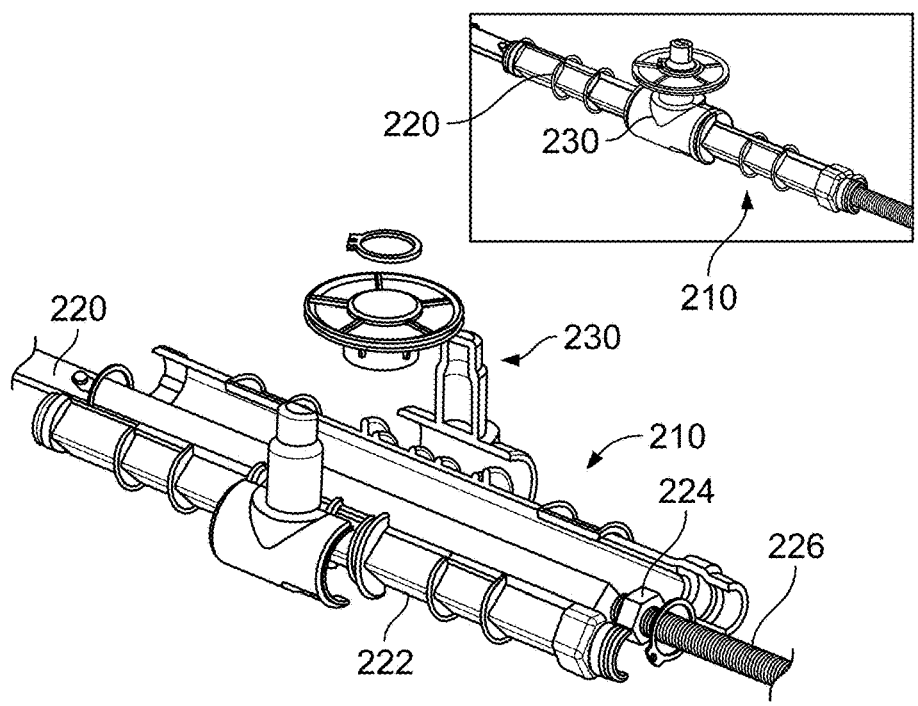
FIG. 4 is a three dimensional illustration of an exploded view (with an inset of the completed assembly) showing certain components contained within the central housing in various embodiments of the invention.

FIG. 4 shows an exploded view of selected components comprising the central housing 210. Central pulley mechanism 230 is fixed to a sheath or torque tube 222 encasing a portion of the main shaft 220. The main shaft 220 may have a square shape that moves freely in and out of the sheath 222. A hex nut 224 cooperates with a threaded drive shaft portion 226 coupled to the main shaft 220 to induce movement when the main shaft 220 is rotated. Generally, when rotational force is applied via the crank handle or other mechanism(s), the sheath 222 and pulley 230 are urged along the threaded drive shaft 226. In turn, and as will be described in greater detail below, this movement engages primary and secondary drive cables engaged with the flywheel seat atop the central pulley 230 and/or other pulleys associated with the engagement mechanism (not shown in this view), ultimately resulting in movement of the claw assembly and engagement of the system 200 with the roof rails.

Figure 5A:
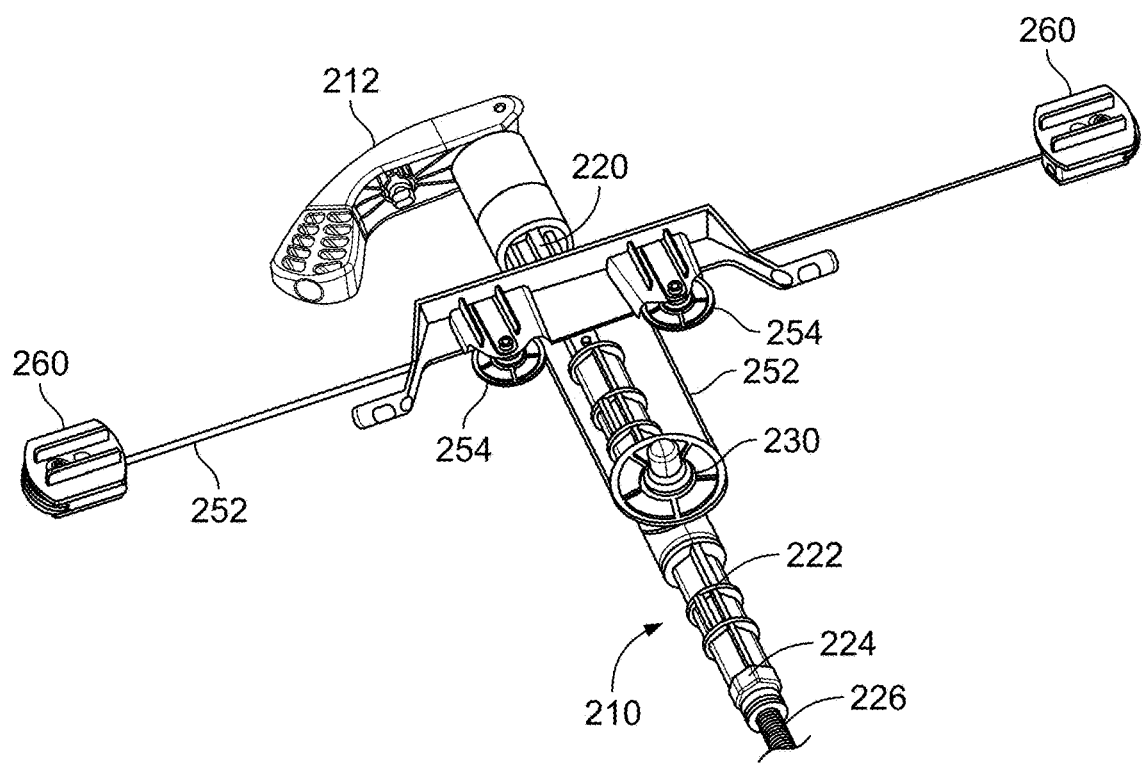
FIGS. 5A and 5B are three dimensional illustrations of certain components contained within the pulley-based attachment system forming portions of the central housing and engagement assembly according to certain embodiments of the invention.

FIG. 5A illustrates selected components from the central housing 210 and one of the roof rack engagement assemblies 250. Primary driver cables 252 feed around a pair of idler pulleys 254 to engage an end block pulley assembly 260. Secondary driver cables of the engagement assembly (not shown in this figure) are associated with secondary drive pulley assemblies 260 to enable the attachment system 200 to grasp and release the roof rack rails. Owing to the movement of the sheath 222 and central pulley 230 in combination with the primary cable 252, sufficient force is translated through the secondary drive pulley block 260 to move and clasp other components of the engagement assembly 250 as will be described in more detail below. Notably, if the claw assembly operatively associated with one of the secondary drive pulley blocks 260 (i.e., that portion of the system has come into contact with roof bars), then the idler pulley 254 associated with that secondary drive block pulley 260 still allows the cable to drive the other/opposite pulley block 260 to permit the eventual engagement of both roof rack rails positioned beneath the engagement assembly 250 in question.

Figure 5B:
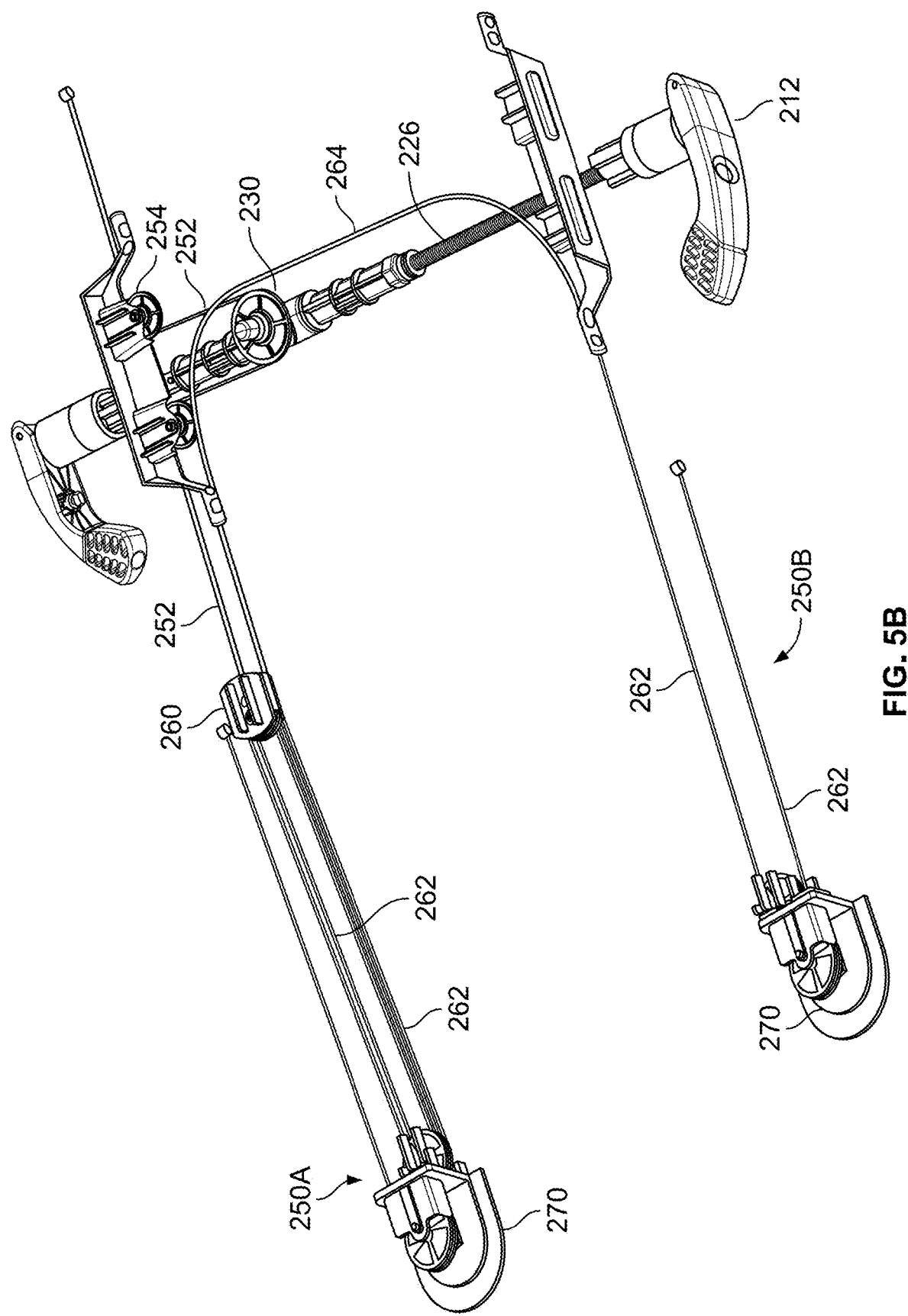

FIG. 5B illustrates a portion of both engagement assemblies 250A and 250B. Secondary driver cables 262 are attached to secondary drive pulley assembly 260, thereby causing it to move in direct response to movement from the primary driver cable 252. Cable sleeve 264 transfers driving force to the opposing engagement assembly 250B (including a claw assembly not shown in this view) via a secondary driver cable 262, while a separate secondary driver cable 262 connects to the claw assembly 300 of engagement assembly 250A. When unimpeded, this arrangement causes equal movement of the claw assemblies in each of the engagement assemblies 250A and 250B although, as noted above, the idler pulley 254 facilitates the independent movement of the claw assemblies when one becomes coupled to the roof bar. The system defined at one end by the end block 270, the primary and secondary driver cables 252 and 262, portions of the idler pulleys 254, and the secondary drive pulley assembly 260 are housed and move within a first channel of an extruded aluminum track system described below, while a separate channel of that system encases and guides the claw assembly 300 with its own secondary driver cable 262.

Figure 5C:
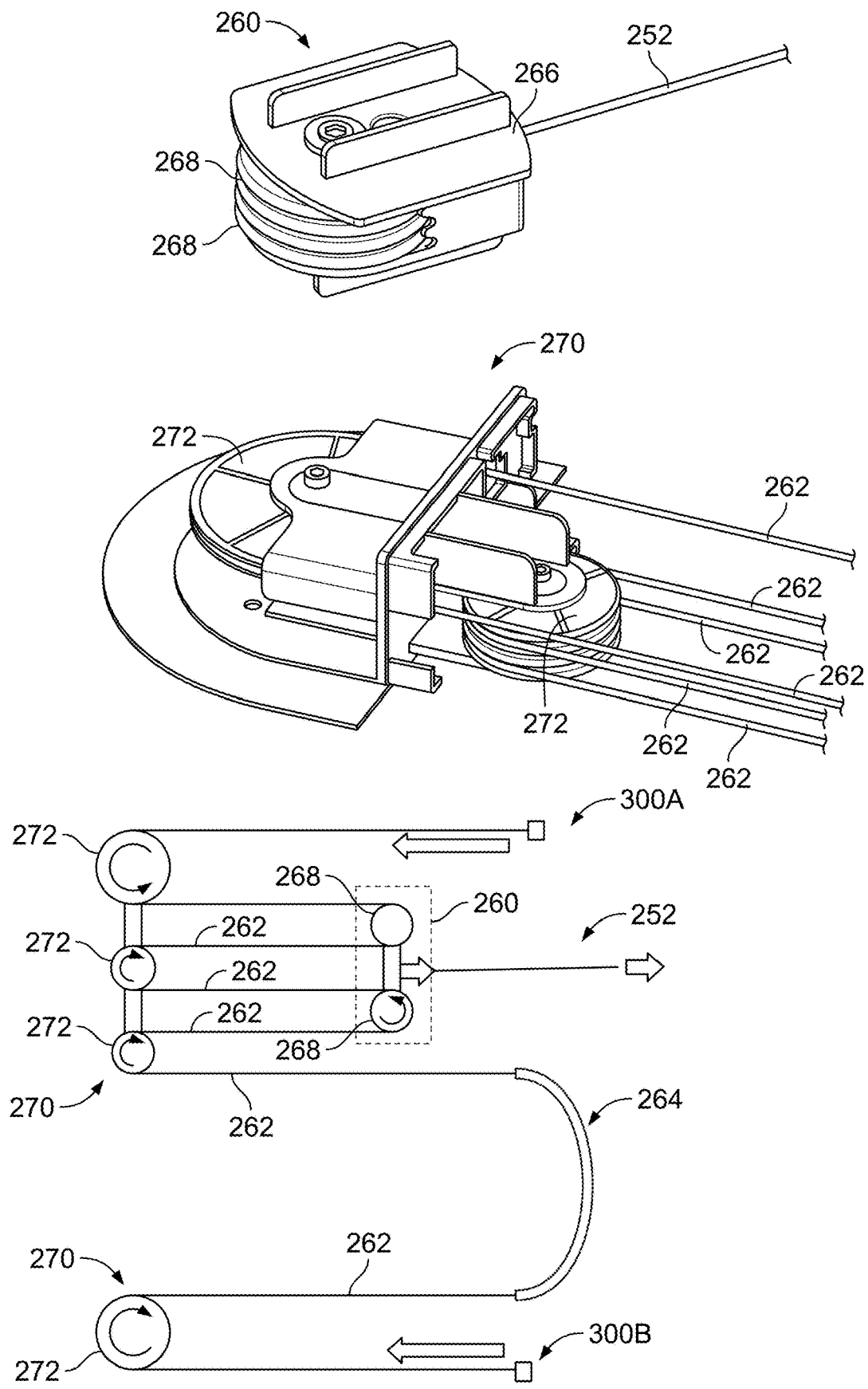
FIG. 5C shows a three dimensional illustrations of the secondary drive and end block pulley assemblies, along with a basic schematic showing the cooperation of these elements, as they that may be used in certain embodiments of the invention.

FIG. 5C illustrates secondary drive pulley assembly 260 is fixed to the primary drive cable 252 at engagement point 266 so as to induce movement within the channel of the track system 280. A plurality of flywheels 268 engage separate secondary cables 262 operatively associated with the claw assemblies (not shown in this figure) by way of the end block assembly 270.

To that end, FIG. 5C separately illustrates an exemplary end pulley assembly 270. The assembly 270 is fixed to the track system, preferably having two separate assemblies located its opposing, terminal ends. At least one end block flywheel 272 translates the motion of the secondary drive cable 262 to induce movement of the claw assembly, in the engagement assembly 250B in FIG. 5B. If the assembly 270 is located within the same channel of track system 280 as the idler pulley 254 (i.e., engagement assembly 250A in FIG. 5B), three separate fly wheels 272 are used to engage two separate secondary drive cables 262. One of the drive cables 262 engages flywheel 272 and then feeds to through cable sleeve 264 to another end block assembly in engagement assembly 250B so as to drive the claw assembly 300B, while the other drive cable 262 re-engages a separate flywheel 268 of the secondary drive assembly 260 before being fed back to the third flywheel 272 of end block assembly 270 to engage and move claw 300A.

Figure 5D:
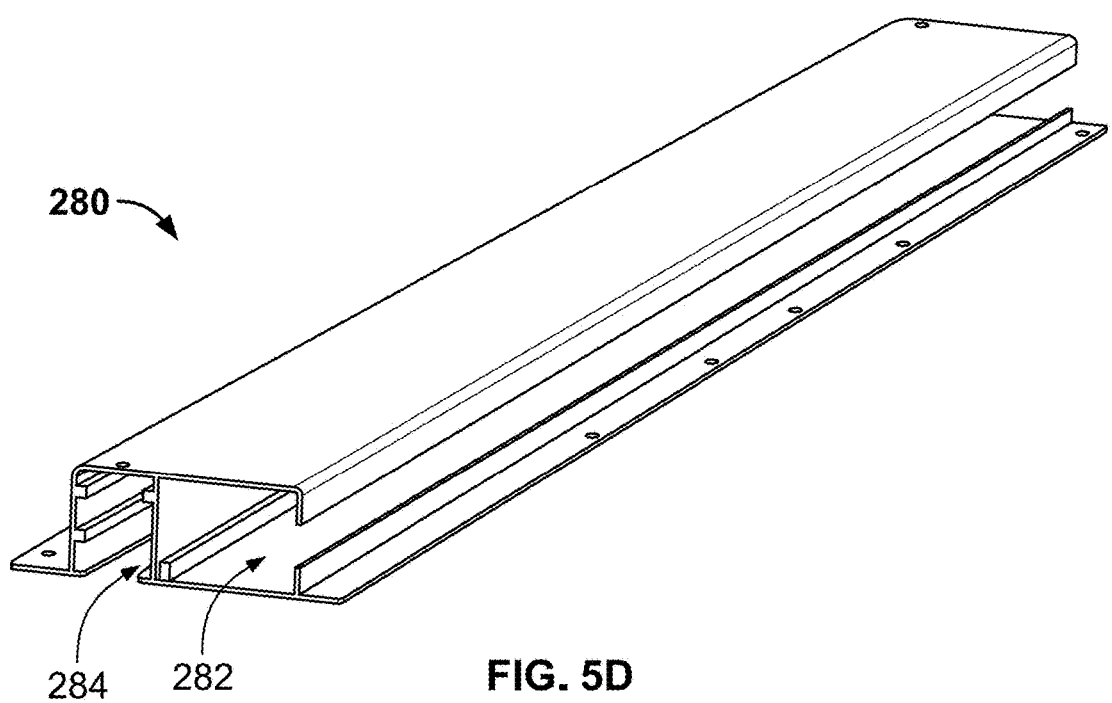
FIG. 5D is a three dimensional illustration of the bifurcated channel that may be used to house portions of engagement assembly.

FIG. 5D shows a preferred, extruded aluminum track system 280 that can house the engagement assemblies 250. A large channel 282 includes an open side to accommodate the idler pulleys 254 and encase and guide the movement of the secondary drive pulley assemblies 270, while a smaller channel 284 with an opening on its underside encases and guides the claw assembly 300. As will be described in greater detail in the discussion of the claw assembly, ratchet teeth or other regular engagement mechanisms (not shown in this view) cooperating with certain components of the claw assembly are provided or formed on, in, or near channel 284 to assist in safely securing the claw assembly to the roof rack rail and to prevent unwanted movement of the claw assembly within the channel 284, especially owing to a failure of any cables, pulleys, or biasing mechanisms.

Although mirror images were not provided in all of the foregoing drawings of the engagement assemblies 250 and attachment system 200, it will be understood that the principles described herein are ideally applied to all points at which the system 200 engages the roof rack. Specifically, four separate claw assemblies and their related/required cables, pulleys, and related apparatus are contemplated, so that engagement assembly 250A accommodates two sets of secondary drive pulley assemblies 260, end block pulley assemblies 270, and claw assemblies within separate extruded track assemblies and engagement assembly 250B also accommodates two sets of secondary drive pulley assemblies 260, end block pulley assemblies 270, and claw assemblies within separate extruded track assemblies. In the same manner, the identification of specific materials (e.g., aluminum) and the characterization of certain components as "extruded" and/or engaging flywheels are not intended as limiting, and alternatives may be employed. Finally, while a single, continuous primary and secondary cables 252 and 262 are illustrated in the schematic of FIG. 5C, it may be possible to incorporate a series of cables in combination with equivalent components in any of the secondary drive assemblies, the end block assemblies, and/or the central housing (including the idler pulleys, drive shafts, central pulley, etc.) in order to accomplish the appropriate translation of user movement via the crank handle or other torque generating means into a lateral driving force that urges the claw assembly back and forth within the track system.

Figure 6:
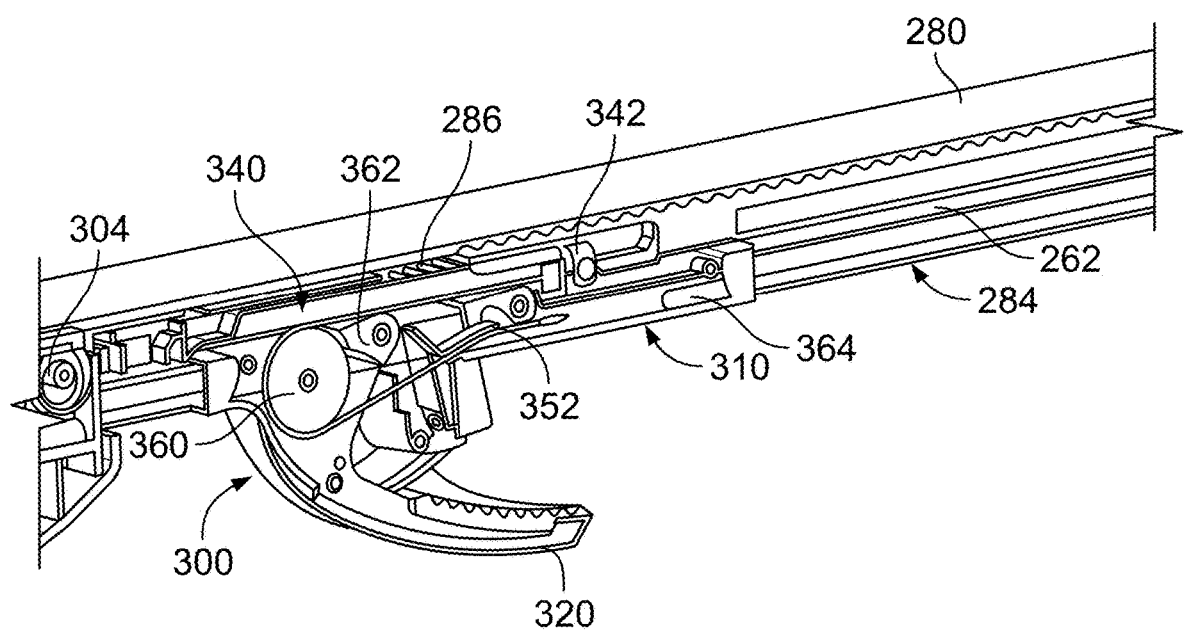
FIG. 6 is a three dimensional, sectional illustration of an attachment mechanism found in the engagement assembly of certain embodiments of the invention.

FIG. 6 provides a three dimensional perspective overview of the components contained within a claw assembly 300, including claw assembly housing 310 and engagement jaw 320. The ratcheted teeth 284 of the extruded track system 300 may be positioned or integrally formed on along a top, inner surface of the secondary channel 284. Secondary drive cable 262, preferably fed directly from the end block assembly (not shown in this view), attaches to one end of the claw assembly 300. A central biasing member 304, comprising one or more springs, is provided and preferably positioned at the opposite end of the assembly 300 from where the drive cable 262 is attached. The sides and bottom edge defining the channel 284 are sufficiently friction free to allow the claw assembly 300 to move within the channel in response to the force exerted by the driver cable 262 and/or the biasing members described below. In operation, the biasing member 304 urges the claw assembly 300, preferably toward the central housing 210, when the engagement assembly 250 is deliberately disengaged. Safety mechanisms, described below and including safety pawl 342, may be employed to guard against unwanted movement and catastrophic disengagement of the attachment system 200.

Figure 7A:
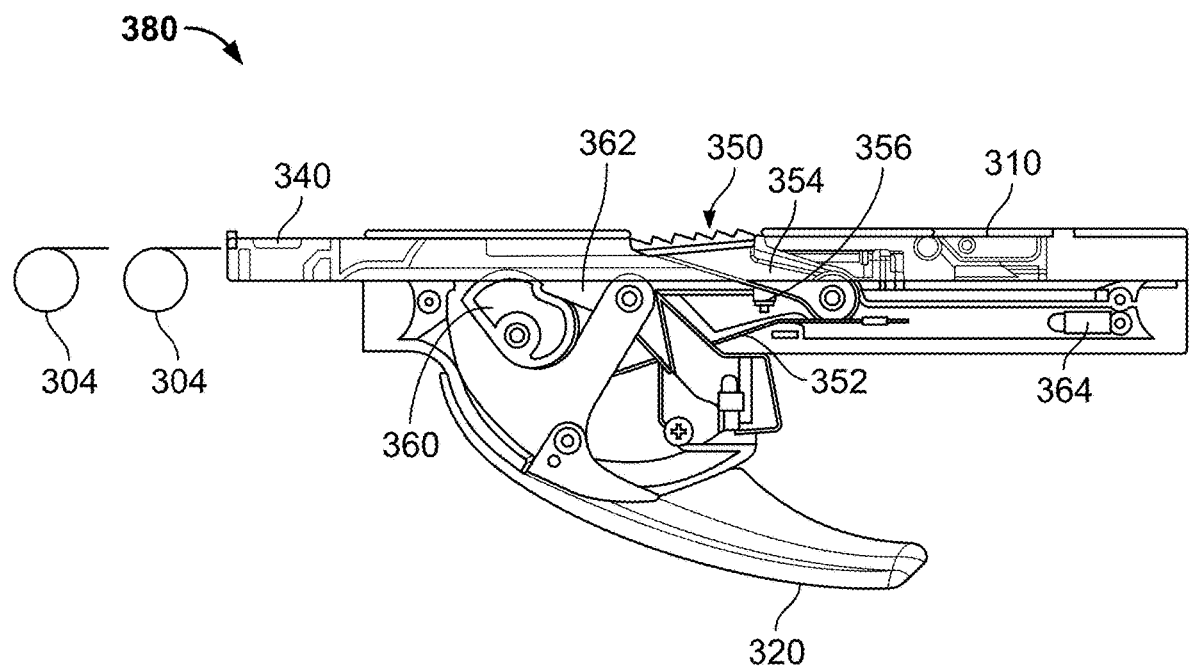
FIGS. 7A, 7B, and 7C are side, cut away views of the attachment mechanism in various stages of engagement in various embodiments of the invention.

In FIG. 7A, the claw assembly 300 is shown from the side with the outer casing of housing 310 partially removed to better illustrate the interaction of components within the assembly 300. A plurality of constant force return springs serve as central biasing member 304. Secondary drive cable 262 attaches to the safety pawl 342 of drive plunger 340. The claw 320 is disengaged (i.e., open and capable of receiving a roof rack bar) in this view.

Drive plunger 340 is illustrated in outline only, although it is attached to springs 304 and secondary drive cable 262 to enable movement (relative to FIG. 7A through 7D) within a slot in the housing 310. Indents, apertures, and/or teeth may be provided in that slot to allow for the engagement of the safety pawl 342, the lock ratchet assembly 350, and other connections and components of the plunger 340 described herein. In addition to providing an attachment point for secondary drive cable 262, safety pawl 342 is connected to, and preferably contained within, the plunger 340 so as to cause the pawl 342 and plunger 340 to move in concert.

Lock ratchet assembly 350 also forms a portion of plunger 340. Assembly 350 includes a slave cable 352 affixed to the lock ratchet body 354, thereby establishing a further connection between drive plunger 340 and assembly 300. A lock ratchet biasing member 356 is positioned proximate to the ratchet body 354 to induce selective movement of the ratchet when the plunger 340 is moved under certain conditions.

An end portion of slave cable 352 attaches to cam pulley 360. Cam pawl 362 cooperates with cam pulley 360 to apprehend rotational movement of cam pulley 360. Cam pulley is further connected to the engagement jaw 320 so as to induce opening and closing movements on the jaw 320 when the cam 360 is rotated under certain conditions. Slave cable return biasing member 364 is provided at the opposing end portion of slave cable 352. Preferably slave cable return spring 364 is contained within the housing 310 but provided beneath the plunger slot of the housing 310 to exert sufficient force to rotate cam pulley 360 when appropriate/permitted by the other system components.

Figure 7B:
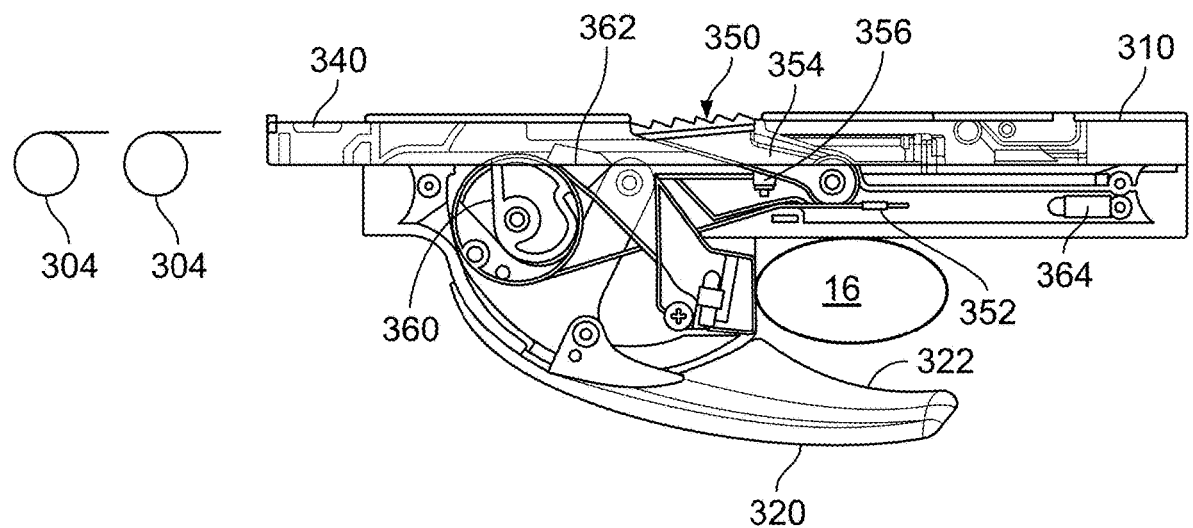

As seen in FIG. 7B, the complete cam pulley 360 is shown in outline, as the engagement jaw 320 in the view of FIG. 7A obscured the view and operation of the cam pulley 360 and cam pawl 362. FIG. 7B illustrates a point at which the secondary drive cable has moved the claw assembly 300 to point that is proximate to roof bar 16 through contact with the trigger lever 366, which rotates or moves inward in response to force created as the assembly 300 is urged toward an immovable object, such as roof bar 16. As roof bar 16 is received within the engagement jaw 320, the bar 16 makes contact with the cam pawl 362. The continued lateral movement of the assembly 300 eventually exerts a pivoting force on the cam pawl 362, causing the pawl 362 to disengage from its indent on the cam pulley 360. In this manner, cam pulley 360 is now free to rotate in response to forces exerted by the drive cable 262 (by way of its attachment to slave cable 352, which is itself connected to the plunger 340) and/or by movement of the slave cable 362 caused by the slave return biasing member 364.

Figure 7C:
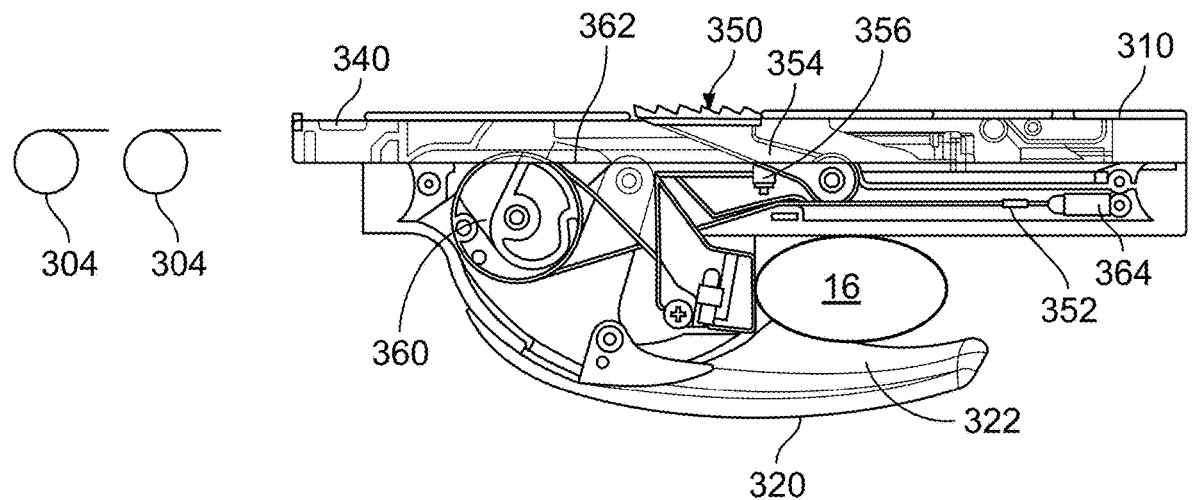

As best illustrated in FIG. 7C, the continued rotation of cam pulley 360 urges the engagement jaw 320 into a closed position. As before, this rotation is caused by the movement of the plunger 340 in concert with the drive cable 262. Similarly, this movement of the plunger 340 now allows lock ratchet biasing member 356 to exert sufficient force to urge the lock ratchet body into a position that is flush with the outer housing 310 and, ultimately, engage the ratchet teeth 284 of the track system 280, thereby removing load from the secondary cables 262 and, by operation of the aforementioned pulleys, primary cable 252. In the same manner, slave cable biasing member 356 now exerts force on the slave cable 352 to prevent unwanted slippage in the cam pulley 360. It will also be understood that the torque limiter 216 in the central housing 210 will activate, and preferably produce an audible click to alert the user, once all of the claw assemblies are urged into the position shown in FIG. 7C. Rubber lining 322 may be provided along the anticipated contact surfaces of engagement jaw 320 to ensure good grip and fitment to the bar 16.

When the crank handles are turned in the releasing direction (e.g., counterclockwise if the engagement rotation was in the clockwise direction), the tension provided by the central biasing members 304 urges the drive plunger 340 back to its original position within the slot of the housing 310. In turn, the slave cable return spring 356 ensures the cam pulley 360 rotates back to its resting position, thereby opening the engagement jaw 320. As the drive plunger is returned to its original position, an indent on the plunger 340 (shown in the inset of FIG. 8) engages the lock ratchet body 354 so as to overcome the pressure of the lock ratchet spring 356, rotating or forcing the lock ratchet assembly 350 to a disengaged orientation (preferably retracted within the outer housing 310 and more preferably back to its original position shown in FIG. 7A). In the disengaged orientation, the lock ratchet assembly 350 allows the entire claw mechanism 300 to move freely within the track system 280 and in response to forces exerted by the secondary drive cable 262. In the same manner, the cam pawl 362 can be biased back into its indent on the cam pulley 360.

The disengaging actions—both for the ratchet assembly 350 and other components—must be sufficient to overcome the any biasing forces that assisted in engagement of the components (e.g., lock ratchet biasing member 356). Therefore, the selection of the various biasing members, and especially the force and direction the force is applied, must be made consciously to ensure the movement of the various components (e.g., the plunger 340, the ratchet assembly 350, the cam pulley 360, the safety pawl 342, etc.) without undue force required from the user or unnecessary stresses applied to the "upstream" components (e.g., the central housing 210, the drive cable 252, the secondary drive assembly 260, the secondary drive cable 262, etc.).

Figure 7D:
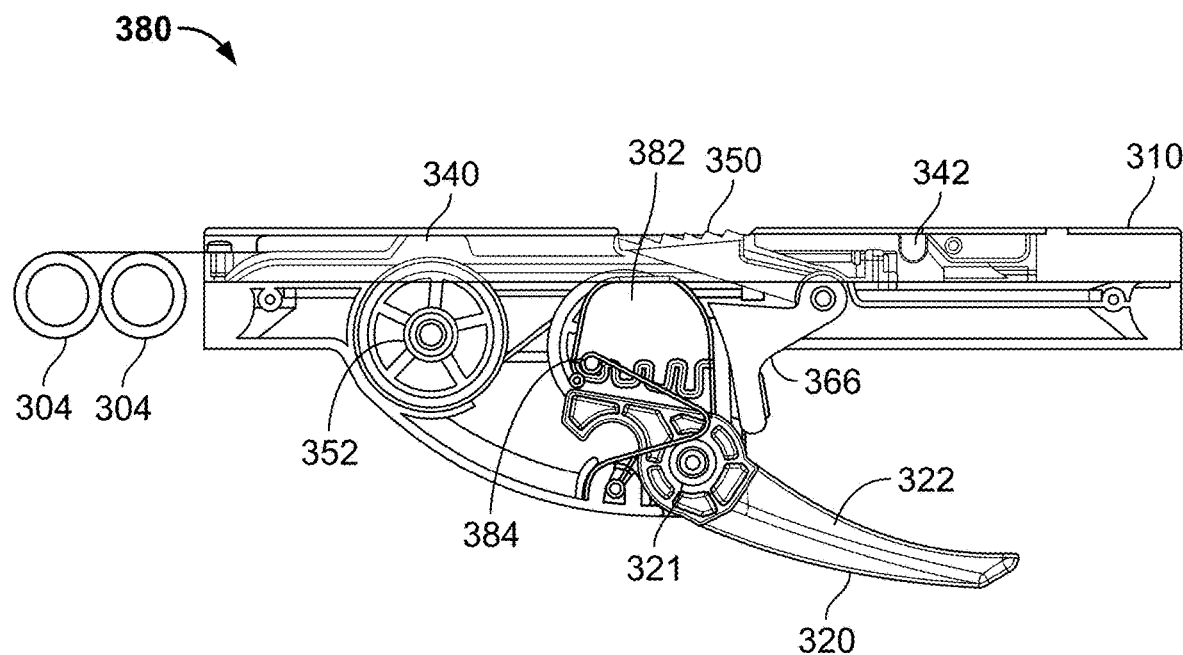
FIGS. 7D and 7E are side, cut away views of an alternative attachment mechanism in various stages of engagement in various embodiments of the invention.
Figure 7E:
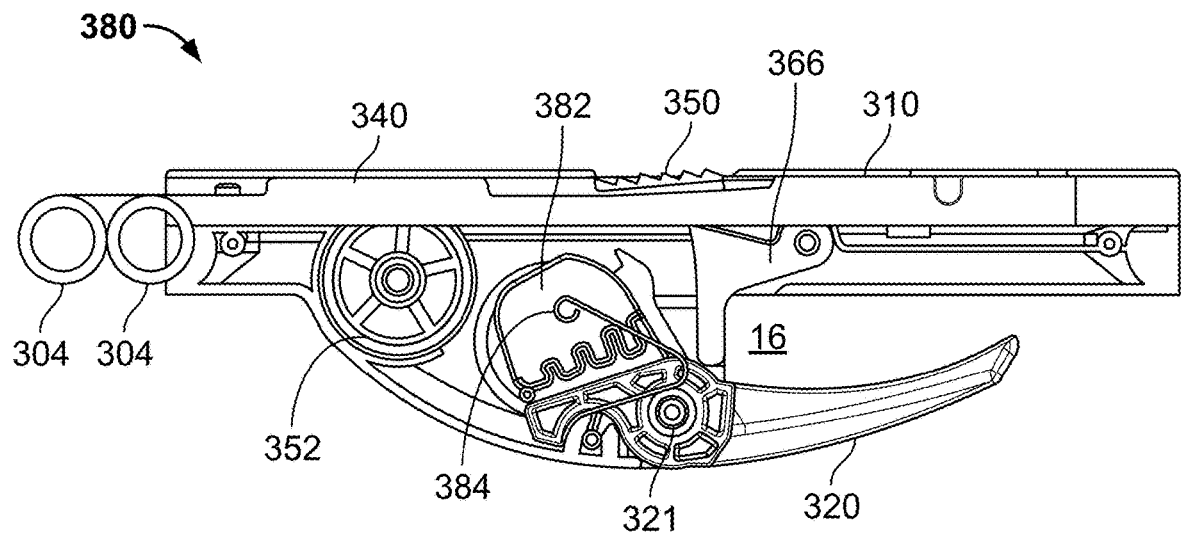
Figure 7F:
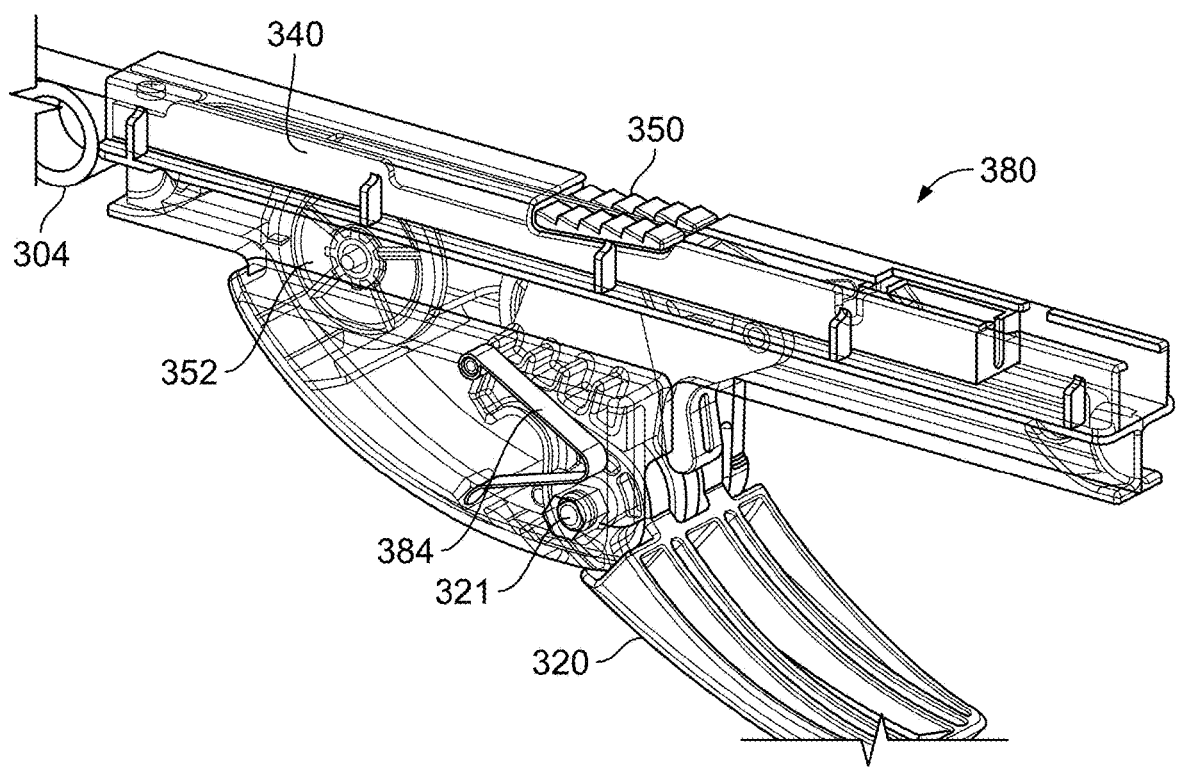
FIG. 7F is a three dimensional, sectional illustration of the alternative attachment mechanism.

FIGS. 7D through 7F show an alternative embodiment for the claw assembly 300 relying on a movable pulley assembly 380. Here, a trigger mechanism is activated by contact with the roof bar 16, but this arrangement restrains the secondary pulley casing until the mechanism is activated. In this manner, the slave cable 352 does not move and, instead, tension in the secondary driver cable 262 alone is sufficient to move assembly 300.

A movable, secondary pulley carrier 382 move cooperates with a biasing member such as a torsion spring or springs 384 so as to urge the pulley 382 in an upward position. Slave cable 352 engages both the secondary pulley 382 and the idler pulley 352, while being anchored to the housing 310. When the jaw 322 is opened, the slave cable 352 does not move so that the entire assembly 380 may move as a single unit in response to force from the drive cable (e.g., the secondary drive cable 262) and/or the central biasing member(s) 304.

Engagement jaw 320 rotates about a single pivot point 321 in response to contact with the roof bar 16. The movement of the trigger 366 against the bar 16 overcomes the force exerted by spring 384 and releases the secondary pulley 382. Now, when additional tension is exerted on the plunger 340 by the drive cable, the slave cable 352 urges a downward motion in the secondary pulley 382 within housing 310 and pushes the pulley 382 against the top edge of jaw 320, resulting in the closing action shown in FIG. 7E. The lock ratchet 350 and safety pawl 342 still operate as disclosed above.

Figure 8:
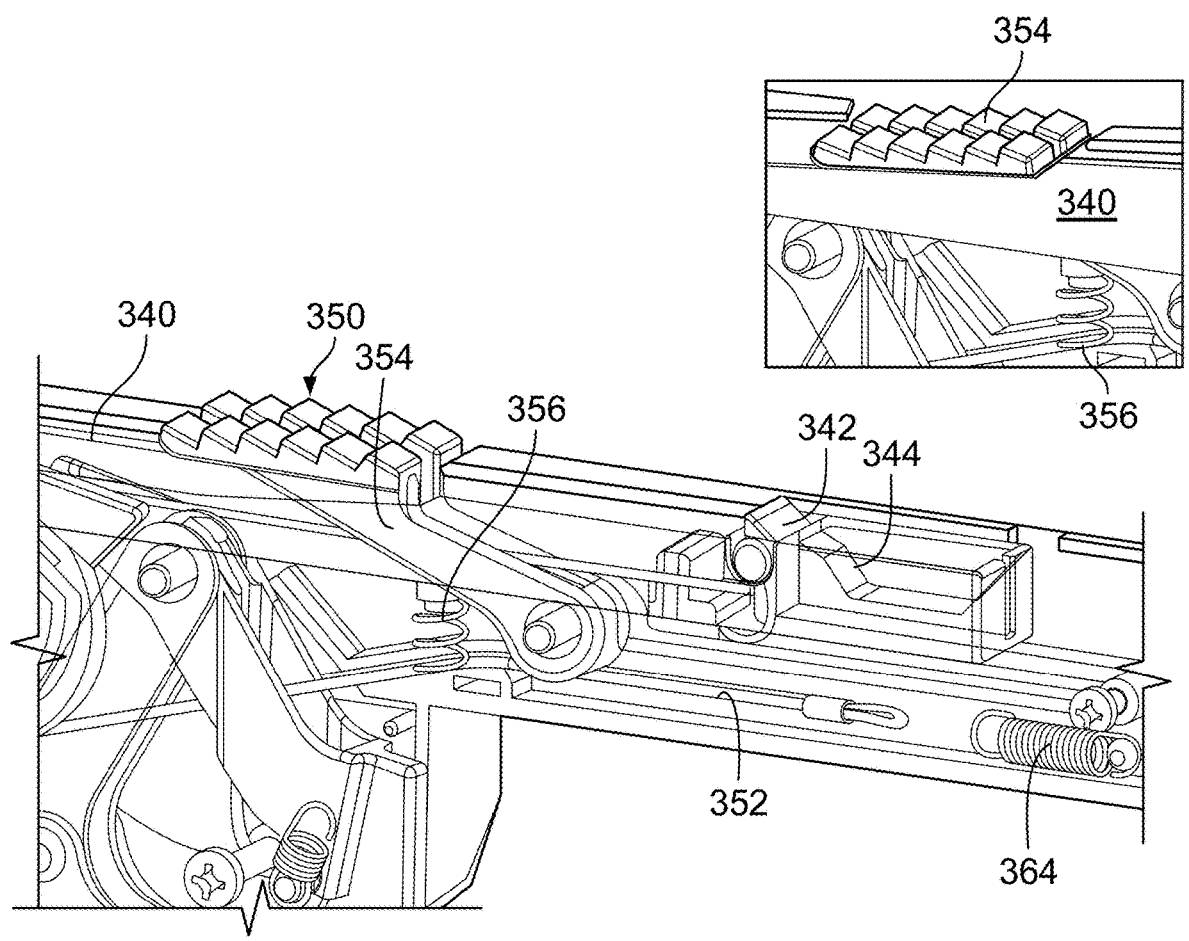
FIG. 8 is a three dimensional illustration of a cut away of the safety mechanism included in the attachment mechanism of the engagement assembly according to certain embodiments of the invention.

As seen in FIG. 8, a torsion spring or other safety pawl biasing member 344 engages the safety pawl 342. As the drive plunger 340 moves to close the engagement jaw 320, the safety pawl 342 aligns with an indent in the housing 310. While the central biasing member 304 normally exerts sufficient tension in concert with the secondary drive cable 262 to keep the safety pawl retracted (e.g., the tension is greater than the spring force exerted by safety pawl biasing member 344), a failure of the primary or secondary drive cable 252, 262 would cause a loss of tension exerted by the spring 304. In this instance, safety pawl spring 344 then urges the pawl 342 out of the plunger 340 and housing 310 to engage the indent. Alternatively, the safety pawl could be designed to protrude out of the housing and engage the ratchet teeth 286 of the track system 280. In either instance, although the clamping force exerted by the engagement jaw 320 will be eliminated, the emergency engagement of the safety pawl 342 ensures that the drive plunger will not immediately move to its original position and disengage the lock ratchet body 350 from the teeth 286 of the track system 280. Therefore, the box should remain attached to the vehicle, while the loss of clamping force will alert the user that a failure has occurred. In this manner, a fail-safe safety mechanism is provided in addition to the central, external engagement mechanism.

Notably, the safety pawl may be incorporated in the cam pulley triggering mechanism shown in FIGS. 7A through 7C or in the movable pulley triggering mechanism shown in FIGS. 7D through 7F. In fact, any of the drive systems, tracks, and other features disclosed in connection the cam pulley are equally applicable to the movable pulley.

As noted above, a series of four separate claw assemblies 300 may be incorporated at four distinct points, with two claws positioned within the track systems 280A and 280B associated with engagement assemblies 250A and 250B. The description of the claw assembly in FIGS. 6 through 8 may apply equally to any of the assemblies contemplated by the system 100. In lieu of ratchet teeth, cooperating mechanisms such as spring loaded pawls engaging regular spaced holes or indentations may be used, and the location of these mechanisms may be altered so long they do not substantially impede the movement of the claw assembly when the system 100 is engaged and positioned to deliver intentional movement initiated by the user. The jaws of each claw are preferably oriented outward from the drive shaft assembly, although the jaws could be aligned in any fashion (e.g., two jaws in one track facing in an opposing direction from the two jaws in the second track, the jaws on one track opening toward each other while the jaws on the second track open away from each other, the jaws all facing the same direction, etc.).

Figure 9A:
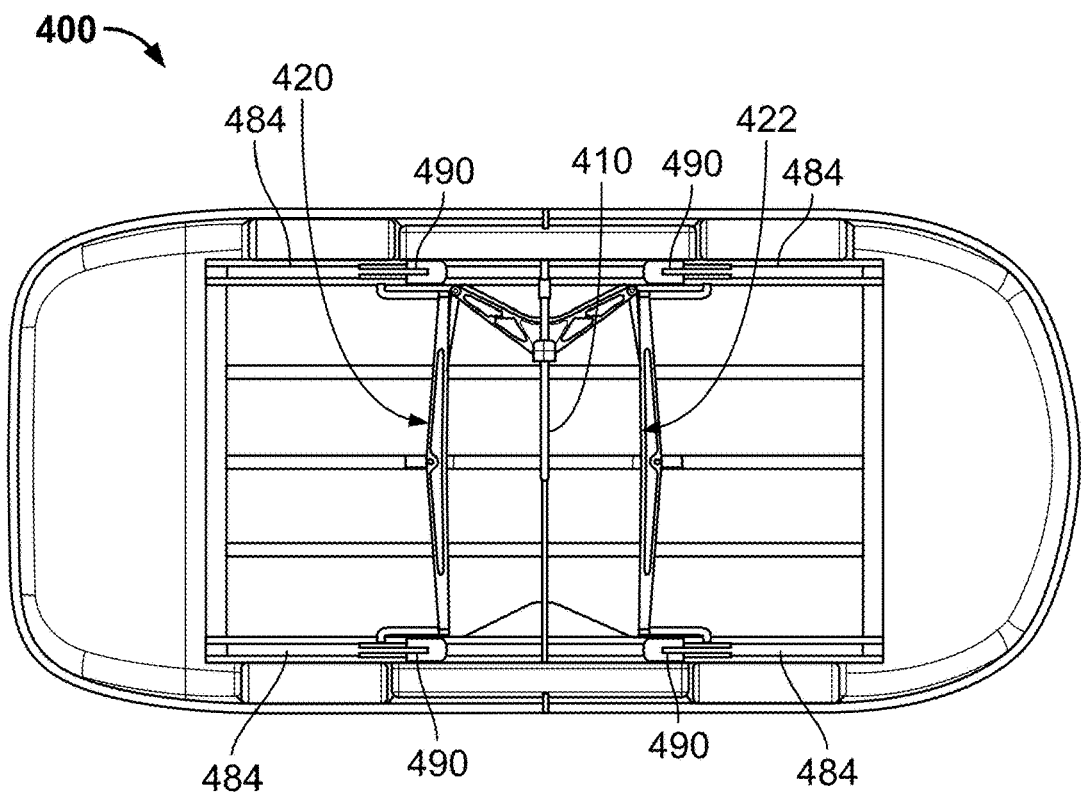
FIGS. 9A, 9B, and 9C are bottom views of the differential lever-based attachment system in various states of engagement in certain embodiments of the invention.
Figure 9B:
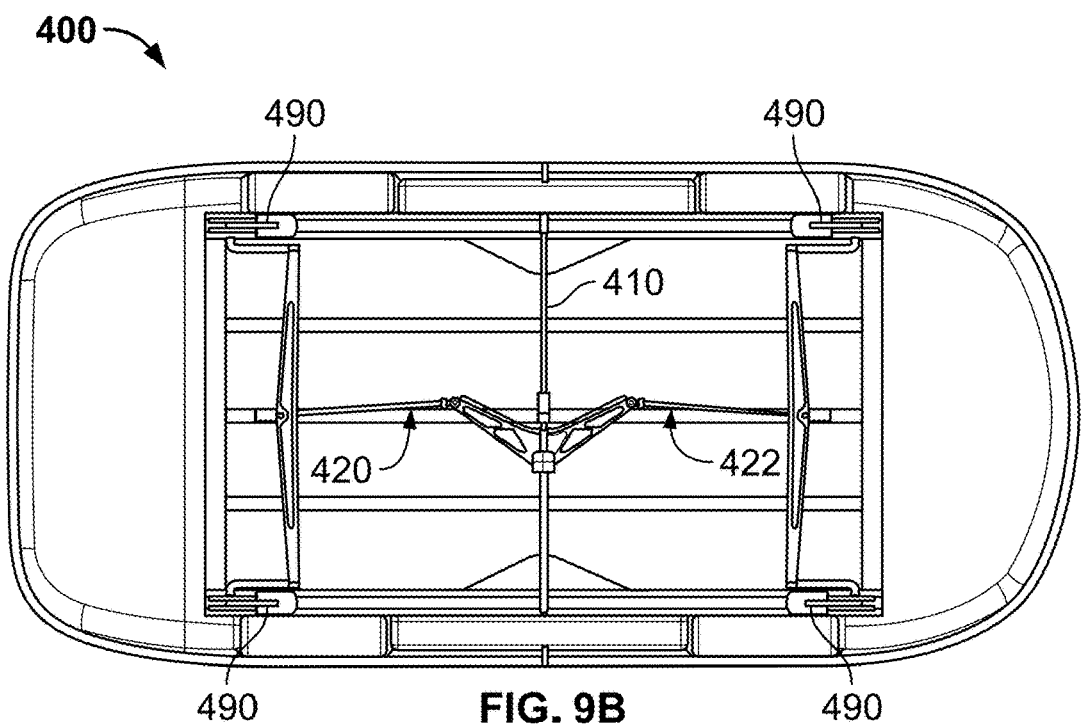
Figure 9C:
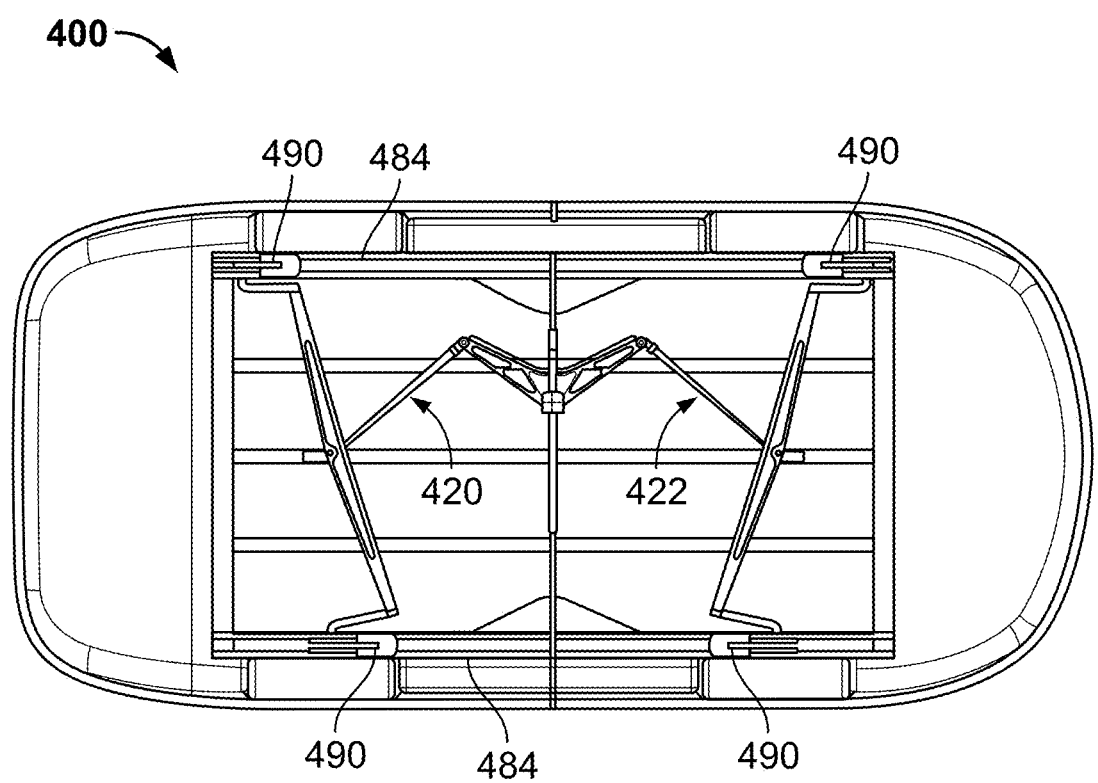

FIGS. 9A through 9C illustrate an alternative to the combined arrangement of the central pulley 230, secondary drive pulley 260, and end block pulleys 270 for driving the claw mechanisms 300. Here, a lever system 400 is driven from a single thread drive shaft 410 driven by crank handles or similar rotational drivers (not shown in this view) similar to those described above. Articulating, pivotable drive arms 420, 422 connect to each of the claw assemblies 490 and rely on differential gears associated with the drive shaft—and possibly one or more clutches—to push outward in response to forces applied to the drive shaft 410. This combination permits the motion of arms 420, 422 to vary independently from one another so as to allow for engagement of the roof bars at different points. Further, the arms include a pivoting attachment, as shown in FIG. 9C to allow for engagement of offset roof bars by claw assemblies 490 provided to channel 484. Further biasing members may be incorporated in arms 420 and 422 to facilitate their movement and/or orientation, particularly in the extremities. Both the claw assemblies 490 and channels 484 may incorporate the elements described and shown in the other figures of this application to effect the operation of the engagement jaws, safety mechanisms, and the like, although in some instances these additional elements may require further structure such as cables and pulleys. In the same manner, aspects of the drive shaft in the central housing, the extruded aluminum track system, and other components may be similar to the previously described embodiments.

Although the embodiments of the present invention have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

I claim:

1. A cargo carrying assembly attachable to the roof rails of a vehicle, the assembly comprising:
    a cargo platform including an uninterrupted cargo floor;
    a transverse drive shaft having an actuator accessible on a lateral facing of the cargo platform;
    a plurality of engagement claws disposed on an underside of the cargo platform; and
    wherein each of the engagement claws are selectively driven between an open position and a closed, locked position by movement of the actuator.

2. The assembly of claim 1 wherein at least one engagement claw includes a biasing member positioned to selectively urge the engagement claw toward the transverse drive shaft.

3. The assembly of claim 2 wherein each engagement claw is selectively driven laterally away from the transverse drive shaft by a drive cable, with the biasing member disposed at an opposing lateral end of the engagement claw relative to the drive cable.

4. The assembly of claim 2 wherein at least one engagement claw comprises a movable jaw with an opening facing away from the transverse drive shaft.

5. The assembly of claim 4 wherein the movable jaw is urged into the closed position by a slave cable.

6. The assembly of claim 5 wherein the slave cable is attached to one of a cam pulley and a movable pulley.

7. The assembly of claim 2 wherein at least one engagement claw further comprises a retractable safety pawl.

8. The assembly of claim 1 wherein the actuator relies upon rotational movement to drive each of the engagement claws.

9. The assembly of claim 8 wherein the actuator further comprises a torque limiter.

10. The assembly of claim 8 wherein the actuator further comprises a lockable crank handle.

11. The assembly of claim 8 wherein the actuator further comprises a folding crank handle.

12. The assembly of claim 8 wherein the actuator further comprises wherein the actuator includes a pair of a crank handles disposed on opposing lateral facings of the platform such that movement of the actuator can be initiated by one of the crank handles.

13. The assembly of claim 1 wherein the transverse drive shaft comprises at least one lateral track with at least one engagement claw moving within the lateral track.

14. The assembly of claim 1 wherein the transverse drive shaft includes a secondary pulley assembly attached to at least one engagement claw moves laterally within a channel formed in the lateral track.

15. The assembly of claim 14 wherein the transverse drive shaft wherein a drive cable moves in a second channel in the lateral track.

16. The assembly of claim 14 wherein the transverse drive shaft wherein a drive cable moves within a channel formed in the lateral track.

17. The assembly of claim 14 wherein the transverse drive shaft wherein the lateral track includes ratchet teeth along an inner facing.

18. The assembly of claim 17 wherein the transverse drive shaft wherein the engagement claw faces and selectively engages the ratchet teeth.

19. The assembly of claim 14 wherein the transverse drive shaft at least one pulley end block is attached to an end of the lateral track.

20. The assembly of claim 1 wherein the transverse drive shaft comprises a pulley system having a drive cable.

21. The assembly of claim 20 wherein the pulley system includes a flywheel urged along the drive shaft by the drive cable.

22. The assembly of claim 20 wherein the pulley system moves transversely along the transverse drive shaft.

23. The assembly of claim 20 wherein the pulley system further comprises at least one secondary pulley block including a secondary drive cable wherein the drive cable is attached to the secondary pulley block and the secondary drive cable attached to the engagement claw.

24. The assembly of claim 23 wherein the secondary pulley block includes a plurality of flywheels.

25. The assembly of claim 20 wherein the pulley system includes at least one idler pulley.

26. The assembly of claim 20 wherein the pulley system is driven by rotational force from the actuator.

27. The assembly of claim 1 wherein the transverse drive shaft comprises a differential gear drive.

28. The assembly of claim 27 wherein the transverse drive shaft further comprises a pair of articulating, pivotable drive arms with at least one engagement claw attached.

* * * * *